United States Patent [19]
Biegler et al.

[11] 3,870,532
[45] Mar. 11, 1975

[54] PROCESS FOR THE PRODUCTION OF ALKALI METAL SILICATES

[75] Inventors: Hanns Biegler, Nagoya, Japan; Juergen Wiljes, Wesseling, Germany

[73] Assignee: Deutsche Gold-und Silber-Scheideanstalt Vormals Roessler, Frankfort am Main, Germany

[22] Filed: Apr. 18, 1973

[21] Appl. No.: 352,395

[30] Foreign Application Priority Data
Apr. 21, 1972 Germany............................. 2219503

[52] U.S. Cl..................................... 106/74, 423/332
[51] Int. Cl............................................... C01b 33/32
[58] Field of Search ............... 423/332, 333; 106/74

[56] References Cited
UNITED STATES PATENTS

| | | | |
|---|---|---|---|
| 3,346,335 | 10/1967 | Schnurch et al..................... | 423/332 |
| 3,392,039 | 7/1968 | Cuneo............................. | 423/332 X |
| 3,576,597 | 4/1971 | Freyhold et al..................... | 423/333 |

FOREIGN PATENTS OR APPLICATIONS

| | | | |
|---|---|---|---|
| 1,183,120 | 3/1970 | Great Britain....................... | 423/332 |

Primary Examiner—Edward Stern

[57] ABSTRACT

A process for preparing an alkali metal silicate having an $Me_2O:SiO_2$ ratio of $1:>3.3$, said process comprising: (1) heating at boiling for a period of about 90 minutes a mixture comprising a fluorine — containing silicic acid and a concentrated alkali metal hydroxide solution, said alkali metal hydroxide in an amount in excess of the stoichiometric amount required to completely react with the fluorine, said silicic acid having a fluorine content of less than 10 weight percent dry basis, a BET — surface area of less than about 100 m$^2$/g and a free water content less than about 40 weight percent; (2) adding to the resulting hot suspension about 1 – 15 weight percent calcium hydroxide based on the weight of the fluorine — containing silicic acid; (3) heating the resulting mixture from step (2) at boiling for a period of about 60 minutes; (4) adding an additional quantity of the concentrated alkali metal hydroxide to the resulting mixture from step (3); (5) heating at boiling the resulting mixture from step (4) for a period of about 3 hours; (6) separating the alkali metal silicate from the hot mixture from step (5).

11 Claims, No Drawings

PROCESS FOR THE PRODUCTION OF ALKALI METAL SILICATES

This invention relates to a process for the production of soluble alkali metal silicates, especially sodium silicate (soda water glass), by the dissolution of a finely divided silicic acid in a concentrated solution of an alkali metal hydroxide. A sodium silicate having an $Me_2O: SiO_2$ ratio of $1:>3.3$ is obtained.

Soluble silicates are customarily prepared by melting sand or other forms of silicic acid with alkalis or suitable salts of alkali metals. They can also be prepared by dissolving silicic acid in the form of a fine sand in a concentrated solution of an alkali metal hydroxide. The alkali metal silicates prepared by these processes generally have an $Me_2O: SiO_2$ ratio of $1: \leq 3.3$.

The alkali metal silicates prepared according to prior art methods have various impurities depending on the starting materials. Most of the impurities, which may be in the raw materials, can usually be removed from the finished product by settling. When the impurity is iron, however, a considerable part of the iron is, as a rule, still detectable in the finished product even after allowing other impurities to settle. This iron impurity in soluble silicates is undesirable in many industrial applications. For example, iron impurities are undesirable in processes for the bleaching of textiles, the production of detergents and fine chemicals, and the production of silicic acids, used as fillers for various purposes. For this reason, it has been customary in the production of silicates intended for these purposes to use only sands or other forms of silicic acids having low iron contents. Such substances, however, are frequently more difficult to obtain than substances with relatively high iron contents.

For the production of particularly pure alkali metal silicates, particularly for scientific uses, it has been proposed to use a pyrogenically prepared, chemically pure, amorphous silicic acid as a starting material. This process is not entirely satisfactory because of the high costs involved. Furthermore, the alkali metal silicates obtained have only limited usefulness because of the high costs.

Thus, there exists a need in the art for a process for the production of a soluble alkali metal silicate, especially sodium silicate, by the dissolution of a finely divided silicic acid in a concentrated solution of an alkali metal hydroxide, whereby products are obtained, which on the one hand are largely free of impurities, especially iron, and on the other hand have the highest possible ratio of $Me_2O:SiO_2$, i.e., $1:>3.3$.

Accordingly, the invention provides a process for preparing an alkali metal silicate, preferably sodium silicate, having an $Me_2O:SiO_2$ ratio of $1:>3.3$. This process comprises a first step of heating a mixture comprising a fluorine — containing silicic acid with a concentrated alkali metal hydroxide solution. The hydroxide is used in an amount in excess of the stoichiometric amount required to completely react with the fluorine. The silicic acid has a fluorine content of less than 10 weight percent dry basis (i.e., the silicic acid free of unbound water), a BET — surface area of less than about 100 m $^2$/g and a free water content less than about 40 weight percent. In the first step, heating is conducted at boiling temperature for a period of about 90 minutes.

To the resulting heat suspension from the first step there is added about 1 – 15 percent by weight calcium hydroxide based on the weight of the fluorine — containing silicic acid used in the process. This mixture is heated in a third step at boiling for a period of about 60 minutes to effect precipitation of a fluoride.

In a fourth step, an additional quantity of the concentrated alkali metal hydroxide is added to the mixture resulting from the third step. This mixture is then heated in a fifth step at boiling for a period of about 3 hours.

Finally, the alkali metal silicate is separated from the hot mixture resulting from the fifth step. Preferably, this separation is accomplished by filtration.

In a preferred embodiment of this invention, the fluorine — containing silicic acid has a BET surface area of less than about 20 m $^2$/g. In a further preferred embodiment, the free water content (i.e., unbound water) is about 30 –35 percent by weight.

The silicic acids employed in practicing the process of this invention are waste silicic acids. Waste silicic acids particularly suited for use in this process are those obtained, for example, from $AlF_3$ processes and $H_2SiF_6$ precipitation reactions.

In processes involving the acid solubilization of crude phosphates for the production of phosphoric acid, other phosphates and fertilizers, there develops as a by-product silicon tetrafluoride which escapes with the exhaust (waste) gases. When the silicon tetrafluoride is hydrolyzed in water, the hexafluorosilicic acid is formed. This can be further processed into valuable fluorine compounds. In case of such processes for the production of $Na_3AlF_6$, $AlF_3$, $NaF$, $NH_3$ and $HF$, basically silicic acid is obtained as a first step. For example the following reaction can take place:

$$H_2SiF_6 + 2\,Al(OH)_3 = 2AlF_3 + SiO_2 + 4H_2O$$

The silicic acid is separated, and depending upon the process and the conditions of precipitation, will have 0 to 70 percent by weight of free water.

In the following example, the process of the invention is explained in more detail. All parts, proportions, percentages and ratios are by weight unless otherwise indicated.

A waste silicic acid from an $AlF_3$ process is used as the starting material. The silicic acid has 33 percent free water, 67 percent dry substance, 4.0 percent fluorine in dry substance, and a BET-surface of 3.6 m $^2$/g.

I. Purification Step (This step is optional and represents a possible better washing out of the material, even during the $AlF_3$ process).

1.5 kg starting material and 1.5 l water are heated to boiling, filtered, washed hot with 1.5 l of water and then air dried.

II. The analysis of the purified starting material shows:

| | | |
|---|---|---|
| about 33% | free water | |
| 67% | dry substance | |
| 91.0% | $SiO_2$ | ) |
| 2.4% | Fluorine | ) |
| | | 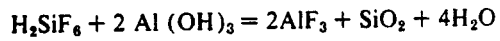 in dry substance |
| 5.1% | bound water | ) |
| 1.5% | alkali-insoluble | ) |

III. Fluoride Activation

To 1.0 kg of the purified starting material from I are added 0.6 kg water and 0.042 kg NaOH (100 percent) (stoichiometric quantity for fluorine neutralization + 20 percent excess). This mixture is heated for 90 minutes at boiling temperature.

IV. Fluoride Precipitation

To the hot suspension of III are added 0.031 kg Ca(OH)$_2$ [100 percent] in 0.2 l water and heated 60 minutes at boiling.

V. SiO$_2$ Solubilization

To the hot suspension of IV, 0.150 kg NaOH (100 percent) in 0.15 l water are added and heated 3 hours at boiling. During the solubilization, 1.0 l of water are added.

VI. Filtration

The suspension of V is filtered hot, and the filter cake is washed with 1.2 l of hot water. Compositions VII and VIII result.

VII. Sodium silicate analysis:
  4.1 kg sodium silicate with
  13.7% SiO$_2$
  3.29% Na$_2$O
  Mole Ratio: 1:4.30 with a content of 0.10% Fluorine VIII. Filter presscake analysis:
  0.2 kg with 31% solid substance.

The process of this invention can be used to prepare alkali metal silicates generally. As used herein, the symbol Me represents an alkali metal. Thus, Me$_2$O represents an alkali metal oxide. The expression "alkali metal" is to be understood as including the elements of Group IA of the Periodic Table. The most common of these are sodium, potassium, and lithium.

As previously indicated, the alkali metal silicates prepared according to the process of this invention, have Me$_2$O: SiO$_2$ ratios of 1:>3.3. The upper limit of this ratio is not critical to the successful operation of this invention, but is typically about 1:46.

In the foregoing discussion it is stated that the alkali metal silicates prepared according to the process of this invention are soluble. By this is meant that the alkali metal silicates are at least soluble in water, and perhaps other solvents.

In practicing the process of this invention, it will be understood that the alkali metal hydroxide is selected in such a manner that the alkali metal of the hydroxide will be the same as the alkali metal of the silicate one desires to produce. Thus, sodium hydroxide is used as the alkali metal hydroxide when preparing sodium silicate according to the invention.

The amount of the alkali metal hydroxide added in Step (4) of the process claimed in this appplication should be an amount sufficient to solubilize the SiO$_2$ in the reaction mixture. Thus, it will be apparent that the amount actually used will vary over a wide range. While excesses of the alkali metal hydroxide can be added in Step IV this will generally be avoided as a practical matter because of the economics of the process. Typically, however, the amount of alkali metal hydroxide added in Step (4) of the process claimed in this application is about 10 – 20 weight percent based on the weight of the fluorine-containing silicic acid.

While the process of this invention has been described in terms of numbered steps, it is to be understood that some of the steps can be performed simultaneously. Thus, steps (2) and (3) can be performed simultaneously; that is, the hot suspension from step (1) can be heated at boiling while the calcium hydroxide is added. In a similar manner steps (4) and (5) can be performed simultaneously.

In the foregoing description of this invention, it is stated that the heating time set forth in the first step of the process claimed herein is about 90 minutes. While other time periods can be used, the time will generally be about 1 - 150 minutes.

Similarly, in Step (2) of the process claimed herein, a time period of 60 minutes has been set forth. The time period in Step II can be about 10 - 150 minutes.

In a similar manner, the time set forth in Step (5) of the process claimed herein need not be exactly 3 hours. Rather, the time period can be about ¼ - 5 hours.

The fluorine content of the fluorine - containing silicic acid employed in this invention is less than about 10 percent by weight on a dry basis. It will be understood that the lower limit of fluorine concentration in the fluorine - containing silicic acid is not generally critical as long as some fluorine is present. Typically, the fluorine content will be about 0.5 - 10 percent by weight.

Similarly, the free water content of the flourine - containing silicic acid is less than 40 percent by weight. Some free water will generally always be present, but the fluorine — containing silicic acid could have 0 percent by weight free water and still be useable in the subject invention. The BET surface area of the fluorine — containing silicic acid employed in the process of this invention is less than 100 m$^2$/g, preferably less than about 20 m$^2$/g. The lower limit of the BET surface area is not critical in practicing the process of this invention. Rather, it will be recognized that the lower limit of the BET surface area will generally be dictated by the ready availability of waste silicic acids.

The alkali metal hydroxide solution employed in the practice of this invention is concentrated, that is, it contains a relatively large proportion of the solute. While the precise percentage of solute is not critical in practicing this invention, the alkali metal hydroxide solution will typically contain at least about 10 weight percent solute.

What is claimed is:

1. A process for preparing a composition comprising an alkali metal silicate having an Me$_2$O:SiO$_2$ ratio of 1:>3.3, wherein Me represents sodium or potassium, said process comprising:

1. heating at boiling for a period of about 90 minutes a mixture comprising a fluorine — containing silicic acid and a concentrated sodium or potassium hydroxide solution, said hydroxide in an amount in excess of the stiochiometric amount required to completely react with the flourine, said silicic acid having a fluorine content of less than 10 weight percent dry basis, a BET — surface area of less than about 100 m$^2$/g and a free water content less than about 40 weight percent;

2. adding to the resulting hot suspension about 1 – 15 weight percent calcium hydroxide based on the weight of the fluorine — containing silicic acid;

3. heating the resulting mixture from step (2) at boiling for a period of about 60 minutes;

4. adding an additional quantity of the concentrated sodium or potassium hydroxide to the resulting mixture from step (3);

5. heating at boiling the resulting mixture from step (4) for a period of about 3 hours;

6. separating the alkali metal silicate from the hot mixture from step (5).

2. Process according to claim 1 in which the BET surface area is less than about 20 m²/g.

3. Process according to claim 1 in which the free water content is about 30 – 35 weight percent.

4. Process according to claim 1 in which the alkali metal silicate is separated in step (6) by filtering.

5. Process according to claim 1 in which the alkali metal silicate is sodium silicate.

6. Process according to claim 5 in which the BET-surface area is less than about 20 m²/g.

7. Process according to claim 6 in which the free water content is about 30 – 35 weight percent.

8. Process according to claim 7 in which the alkali metal silicate is separated in step (6) by filtering.

9. Process according to claim 6 in which the $Me_2O$:$SiO_2$ ratio is up to about 1 : 4.6.

10. Process according to claim 9 in which the amount of sodium hydroxide added in step (4) is about 10 – 20 weight percent based on the weight of the fluorine-containing silicic acid.

11. Process according to claim 5 in which said fluorine-containing silicic acid is a waste silicic acid.

* * * * *